(12) United States Patent
Laczko, Sr. et al.

(10) Patent No.: US 6,266,754 B1
(45) Date of Patent: Jul. 24, 2001

(54) SECURE COMPUTING DEVICE INCLUDING OPERATING SYSTEM STORED IN NON-RELOCATABLE PAGE OF MEMORY

(75) Inventors: Frank L. Laczko, Sr., Allen; Donald E. Steiss, Richardson, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/314,397

(22) Filed: May 19, 1999

Related U.S. Application Data
(60) Provisional application No. 60/087,195, filed on May 29, 1998.

(51) Int. Cl.⁷ .............................. G06F 12/10; G06F 12/12
(52) U.S. Cl. ...................... 711/203; 711/163; 711/152; 713/200
(58) Field of Search ................................. 713/200–202; 711/203, 152, 163; 725/2.5

(56) References Cited

U.S. PATENT DOCUMENTS

| | | | |
|---|---|---|---|
| 5,319,758 | * 6/1994 | Arai et al. | 395/400 |
| 5,628,023 | * 5/1997 | Bryant et al. | 395/800 |
| 6,006,328 | * 12/1999 | Drake | 713/200 |

FOREIGN PATENT DOCUMENTS

| | | | |
|---|---|---|---|
| WO 98/15086 | 4/1998 | (WO) | H04L/9/32 |

* cited by examiner

*Primary Examiner*—Matthew Kim
*Assistant Examiner*—Pierre M. Vital
(74) *Attorney, Agent, or Firm*—Robert D. Marshall, Jr.; W. James Brady, III; Frederick J. Telecky, Jr.

(57) ABSTRACT

A diagnostic program can check the security of a program. The program is stored at predetermined non-relocatable physical address in memory. The diagnostic program is loaded and checks the program at the predetermined physical address against a standard. The diagnostic program then indicates that the program is verified as secure if it meets the standard or non-verified as secure if it does not meet the standard. If the program is not verified as secure, then the diagnostic program may take remedial action such as disabling normal operation of the program, be transmitting a predetermined message via the system modem or downloading another copy of the program via the modem. The program is made non-relocatable using a special table lookaside buffer having a fixed virtual address register and a corresponding fixed physical address register.

9 Claims, 5 Drawing Sheets

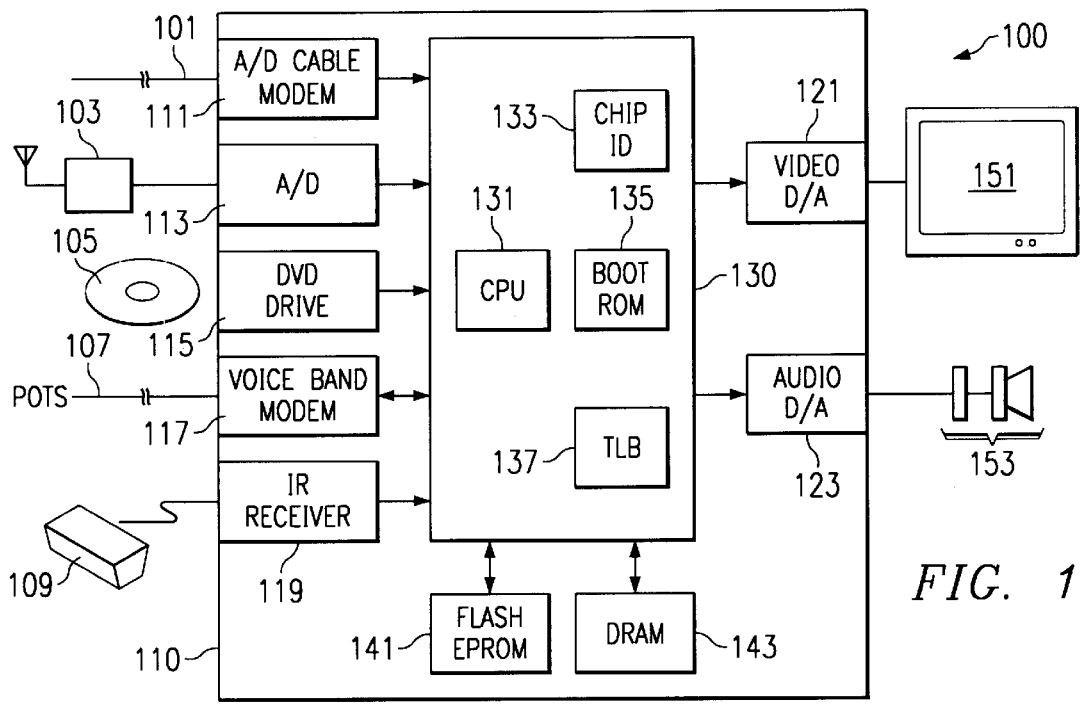
FIG. 1
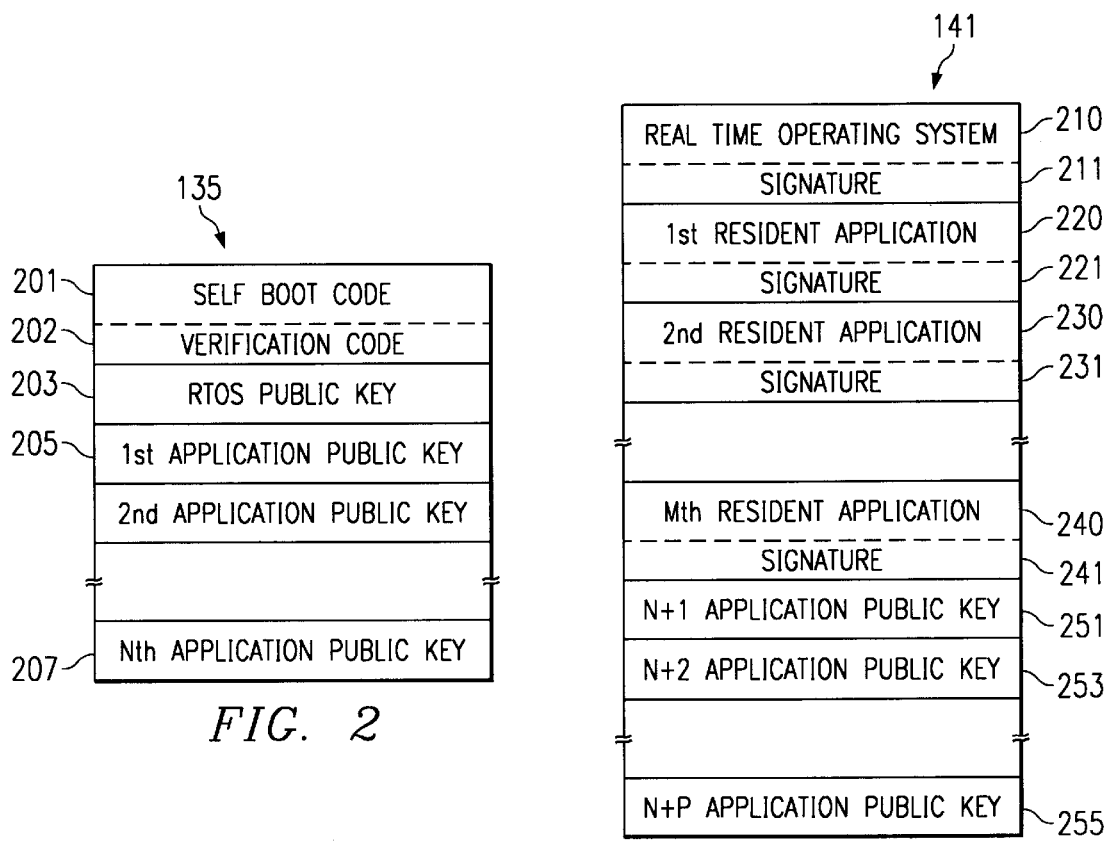
FIG. 2
FIG. 3

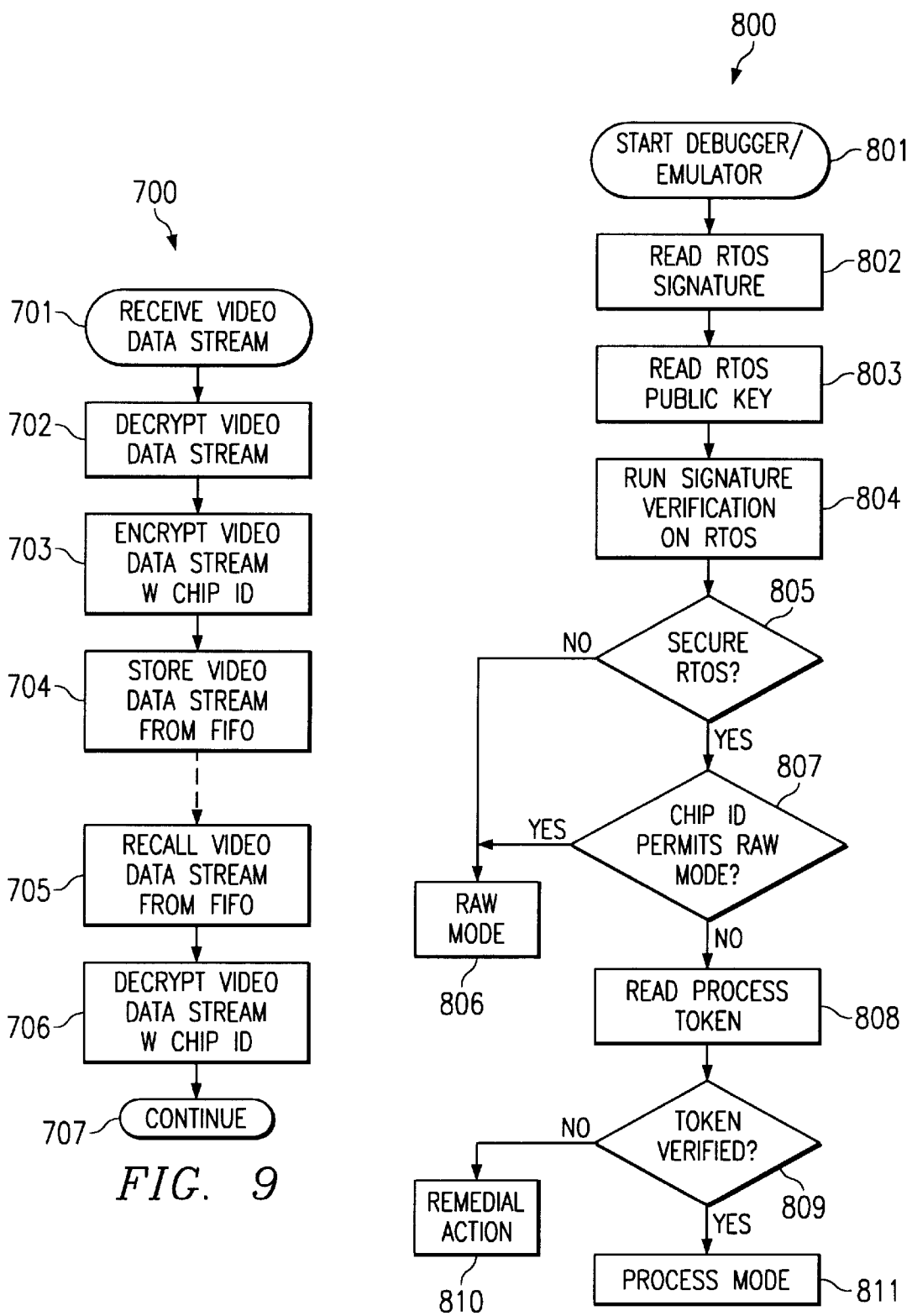

SECURE COMPUTING DEVICE INCLUDING OPERATING SYSTEM STORED IN NON-RELOCATABLE PAGE OF MEMORY

This application claims priority from U.S. Provisional Application No. 60/087,195 filed May 29, 1998.

TECHNICAL FIELD OF THE INVENTION

The technical field of this invention is secure computing systems, especially computer systems that may execute after manufacture field provided programs secured to prevent the user from unauthorized use of selected computer services. The computer system may also be functionally reprogrammable in a secure manner.

BACKGROUND OF THE INVENTION

There are currently many methods to deliver video programming to a users television besides over the air broadcast. Numerous service providers are available to supply this programming to television viewers. Most of these service providers vend a hierarchy of services. Typically there is a basic service for a basic fee and additional services available for an additional fee. The basic services typically include the broadcast network programming, cable superstations, music and sports programming. These basic services are typically supported by advertizing. These basic programming services thus operate on the same economics as over the air broadcast television. The additional services typically include the so called "premium" programming such as sports and movies. These premium programming services are typically not advertizer supported. These are perceived by the television user as higher value services and television users are willing to pay their service providers additional fees for these services. The service provider passes much of this additional fee to the content providers as their compensation for supplying the programming. There may be one or several tiers of these premium services made available by the service providers. At the top of this programming hierarchy is pay per view programming. Pay per view programming typically includes music concerts and sporting events perceived as time sensitive and highly valuable by the television users. Pay per view may also include video on demand, where the television user requests a particular movie be supplied. This hierarchy of service exists for all current alternative methods of program delivery including television cable, over the air microwave broadcast and direct satellite television.

Reception of such alternative programming services has required an additional hardware appliance beyond the user provided television receiver since the beginning of cable television. Initially this additional hardware appliance merely translated the frequency of the signal from the transmission frequency to a standard frequency used in broadcast television. Such a standard frequency is receivable by the user provided television receiver. This additional hardware appliance is commonly know as a "set top box" in reference to its typical deployment on top of the television receiver. Current set top boxes handle the hierarchy of security previously described.

In the past these set top boxes have been fixed function machines. This means that the operational capabilities of the set top boxes were fixed upon manufacture and not subject to change once installed. A person intending to compromise the security of such a set top box would need substantial resources to reverse engineer the security protocol. Accordingly, these such fixed function set top boxes are considered secure. The future proposals for set top boxes places the security assumption in jeopardy. The set top box currently envisioned for the future would be a more capable machine. These set top boxes are expected to enable plural home entertainment options such as the prior known video programming options, viewing video programming stored on fixed media such as DVD disks, Internet browsing via a telephone or cable modem and playing video games downloaded via the modem or via a video data stream. Enabling the set top box to be programmed after installation greatly complicates security. It would be useful in the art to have a secure way to enable field reprogramming of set top boxes without compromising the hierarchy of video programming security.

SUMMARY OF THE INVENTION

The invention is a secure computing system. A diagnostic program can check the security of a program. The program is stored at predetermined physical address in memory. Relocation of these physical addresses where the program is stored is prevented. The diagnostic program is loaded and checks the program at the predetermined physical address against a standard. The diagnostic program then indicates that the program is verified as secure if it meets the standard or non-verified as secure if it does not meet the standard.

If the program is verified as secure, then the diagnostic program permits normal operation of the program. If the program is not verified as secure, then the diagnostic program may take remedial action. The remedial action may be disabling normal operation of the program. The remedial action may be transmitting a predetermined message via the system modem to a predetermined phone number. The diagnostic program may also download another copy of the program via the modem.

The program is made non-relocatable using a special table look-aside buffer. The table look-aside buffer has a fixed virtual address register and a plurality of writable virtual address registers. Each of these virtual address registers has a comparator and a corresponding physical address register. The physical address register corresponding to the fixed virtual address register is also fixed. The fixed virtual address register and the fixed physical address register encompass the range of addresses where the program is stored. The fixed virtual address register and the fixed physical address register are preferably mask programmable in manufacture via a metal layer.

The multiplexer of the table look-aside buffer is responsive to an indication of a match by the comparator corresponding to the fixed virtual and physical address registers to lock out other virtual address regardless of any by any of other comparators. This is achieved using a plurality of AND gates. Each AND gate has an inverting input receiving the match signal from the first comparator and an noninverting input connected to a corresponding one of the other comparators. Each AND gate provides an output to the multiplexer. A match by the first comparator prevents transmission of a match by any of other comparator. Thus the computer cannot be programmed to relocate the program within the address space and disguise the relocation using virtual memory. This prevents the interference with the verification process.

The fixed virtual address register and the fixed physical address register may be registers ostensibly writable via the instruction set architecture. In this case, attempts to write to these registers do not change their contents. In addition, it is preferable that attempts to write to these registers produce no faults or exceptions. Alternatively, the fixed virtual address register and the fixed physical address register may not be accessible via the instruction set architecture.

BRIEF DESCRIPTION OF THE DRAWINGS

These and other aspects of this invention are illustrated in the drawings, in which:

FIG. 1 is a block diagram of one embodiment of the secure computing system of this invention;

FIG. 2 is an example memory map of the boot read only memory of the digital media processor illustrated in FIG. 1;

FIG. 3 is an example memory map of the nonvolatile memory of the set top box illustrated in FIG. 1;

FIG. 9 is a flow chart of the process of encrypting and decrypting compressed video data temporarily stored in random access memory; and FIG. 10 is a flow chart of the process of mode selection in a hardware debugger/emulator.

DETAILED DESCRIPTION OF PREFERRED EMBODIMENTS

Figure 4:
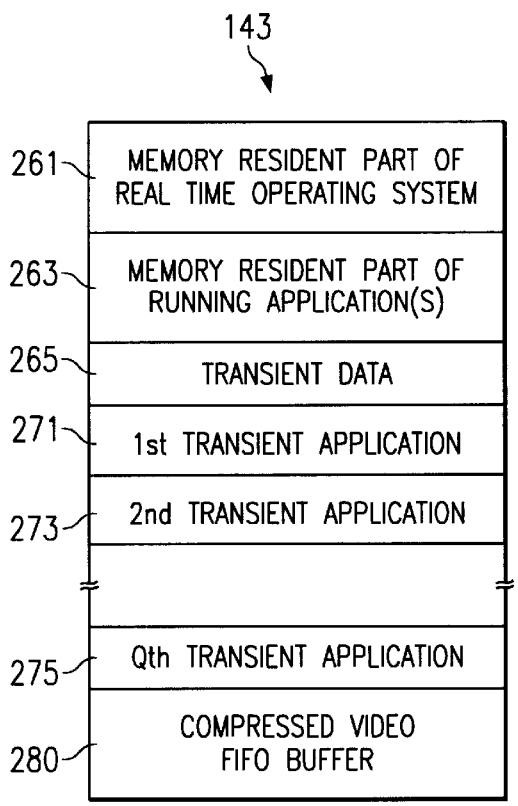
FIG. 4 is an example memory map of the read write memory illustrated in FIG. 1.

The set top box of the future will enable home entertainment options such as the known video programming options, viewing video programming stored on fixed media such as digital video disks (DVD), Internet browsing via a telephone or cable modem and playing video games downloaded via the modem or via a video data stream. Such a variety of capability can only be provided by a fully programmable data processor which can receive and run downloaded programs. This opens up a host of security issues. Since much of the utility of the system depends on being able to download various applications, the possibility also exists for an unauthorized application being downloaded. Such an unauthorized application may be deliberately written to compromise the hierarchy of security.

Fully programmable set top boxes are vulnerable to three main types of attacks. An unauthorized application may interact with the operating system, possibly bypassing security. The set top box nonvolatile memory may be replaced with modified resident applications, but with the original operating system. The nonvolatile memory may be replaced with a new operating system. The most important item to protect is the operating system. If the operating system is compromised, an unauthorized person can do almost anything, including disguising the fact that the operating system is compromised.

FIG. 1 illustrates in schematic form the parts of a versatile, programmable set top box system 100. Set top box system 100 is responsive to inputs from: television cable 101; direct satellite receiver front end 103; digital video disk (DVD) 105; an ordinary telephone line 107; and infrared remote control 109. These inputs are conventional and need not be more fully described here. Any interaction of these conventional inputs with the parts of this invention will be more fully described below.

The central part of set top box system 100 is the set top box 110. Set top box 110 includes various interfaces for the inputs including: video analog-to-digital converter 111 connected to the television cable 101, which may optionally include a cable modem; video analog-to-digital converter 113 connected to direct satellite receiver front end 103; a DVD player capable of receiving and reading DVD 105; voice band modem 117 connected to telephone line 107; and infrared receiver 119 capable of receiving the infrared signals from infrared remote control 109.

Set top box 110 includes several output devices coupled to digital media processor 130. Video digital-to-analog converter 121 receives a video data stream from digital media processor 130 and supplies an corresponding video signal to television receiver 151. Typically the desired video data stream is modulated upon a carrier having a frequency which television receiver 151 can normally receive. It is contemplated that video media processor 130 in cooperation with video digital-to-analog converter 121 will be capable of producing a video signal in a plurality of formats. Upon set up of set top box system 100 the particular format will be selected to correspond to the capability of the particular television receiver 151 employed. Audio digital-to-analog converter 123 receives an audio data stream from digital media processor 130 and supplies a base band audio signal to audio system 153. It is contemplated that this audio signal may encompass plural audio channels (i.e. left and right channels for stereo). It is also contemplated that any particular video source may include plural encoded audio data streams such as alternative languages, descriptive video or other separate audio programs (SAP). Note also that the audio data stream will typically also be modulated on the same carrier as the video signal for reception and demodulation by television receiver 151.

The intelligent part of set top box 110 is digital media processor 130. Digital media processor 130 is preferable embodied in a single integrated circuit. Note that in order for set top box 110 to be fully secure as intended in this invention, central processing unit 131 and boot ROM 135 must be located on the same integrated circuit. Digital media processor 130 includes central processing unit 131. Central processing unit 131 is illustrated generically and is not intended to limit the structure employed. Central processing unit 131 preferably includes data processing capability for control functions required for selection of operating mode, channel tuning, security functions and the like. Central processing unit 131 preferably also includes digital signal processing capability for decompressing compressed video and audio signals, decrypting encrypted video signals, converting the received video to the format of the user's television receiver, operating as a "software" cable modem and voice band modem and demodulating the signal from infrared remote control 109. Central processing unit 131 may include a microprocessor and a digital signal processor, a single data processor capable of all the necessary functions or a multiprocessor. The exact nature of central processing unit, except for details noted below, is not relevant to this invention.

Digital media processor 130 further includes chip identity register 133. Chip identity register 133 is a programmable readable register holding an identity number unique to the integrated circuit embodying digital media processor 130. This identity number is preferably implemented as taught in U.S. patent application Ser. No. 08/813,887 entitled "CIRCUITS, SYSTEMS, AND METHODS FOR UNIQUELY IDENTIFYING A MICROPROCESSOR AT THE INSTRUCTION SET LEVEL" and filed Mar. 7, 1997, now U.S. Pat. No. 6,065,113 issued May 16, 2000. As described in this patent application, the unique identification code is formed in a read-only data register by laser probing following integrated circuit test. The unique chip identity number may be specified via selective blowing of fuse or antifuse links or other techniques. This identity number permits a program to verify the exact identity of the particular digital media processor 130 used in the set top box 110.

Digital media processor 130 includes boot read only memory (ROM) 135. Digital media processor 130 is constructed so that central processing unit 131 begins executing program instructions stored within boot ROM upon each initial application of electric power. An exemplary memory map of boot ROM 135 is illustrated in FIG. 2. Those skilled in the art will realize that the exact order of storage of the various parts is not as important as the existence of the detailed data types. Boot ROM 135 includes self boot code 201. Self boot code 201 is the program instructions initially executed by central processing unit 131 upon each initial application of electric power to digital media processor 130. In addition the known processes for initializing computer systems, self boot code 201 also includes verification program code 202. Verification program code 202 will be further described below in conjunction with FIG. 5. Boot ROM 135 also includes a public signature keys. These public signature keys include real time operating system (RTOS) public signature key 203, first application public signature key 205, second application public signature key 206 to the Nth application public signature key 207. These public signature keys are employed in verification of the authorization of programs in a manner that will be further described below.

Digital media processor 130 also includes table look-aside buffer (TLB) 137. Table look-aside buffer 137 is employed to enhance security during virtual memory operation in a manner further described below.

Set top box 110 includes flash (electrically programmable read only memory) EPROM 141 bidirectionally coupled to digital media processor 130. Flash EPROM 141 serves as the nonvolatile memory for set top box system 100. This is known as a nonvolatile memory because it retains its contents when electric power is turned off. Nonvolatile memory is needed for the real time operating system (RTOS) and for resident applications. FIG. 3 illustrates an exemplary memory map of flash EPROM 141. Flash EPROM 141 includes the real time operating system (RTOS) 210. RTOS 210 includes program code enabling digital media processor 130 to receive and process various data streams as they are received, i.e. in "real" time. RTOS 210 also enables digital media processor 130 to respond to operator control via infrared remote control 109 and infrared receiver 119. RTOS 210 includes a signature portion 211 whose use will be further described below. Flash EPROM 141 includes program code fOr the first resident application 220 with its corresponding signature portion 221. Likewise, flash EPROM 141 included program code for the second resident application 230 and its corresponding signature portion 231 and program code for other resident applications to the Mth resident application 240 and its corresponding signature portion 241. Flash EPROM 141 optionally includes additional public keys including N+1st public key 251, N+2nd public key 253 to N+Pth public key 255. These additional public signature keys are similar to the N public signature keys stored in boot ROM 135. Their use will be detailed below.

Set top box 110 further includes dynamic random access memory (DRAM) 143 bidirectionally coupled to digital media processor 130. DRAM 143 is a volatile memory that serves as read/write memory to temporarily store transient data during normal operations. DRAM 143 is preferably embodied by synchronous memory employing a RAMBUS interface. FIG. 4 illustrates an exemplary memory map of DRAM 143. DRAM 143 stores the memory resident part 261 of the real time operating system. Depending upon the particular status of set top box system 100 this memory resident part 261 of the RTOS may differ as known in the art. DRAM 143 stores the memory resident parts 263 of the currently running application or applications. These applications may be resident applications stored in flash EPROM 141 or transient applications stored in other parts of DRAM 143. Depending upon the status of set top box system 100, there may be various applications running and their immediately accessible parts will be stored in DRAM 143 for faster access than from flash EPROM 141. DRAM 143 also stores transient data 265. This transient data 265 includes temporary data used by the various applications as well as the current control status as controlled by the user via infrared remote control 109 and infrared receiver 119. DRAM 143 stores the program code of various transient applications such as first transient application 271, second transient application 273 to Qth transient application 275. Transient applications are those loaded via cable modem 111, voice band modem 117 or DVD drive 115 that are intended for use only during the current session of set top box system 100. These may include video games, Internet browsing and the like. These transient applications are loaded into DRAM 143 each time they are used and then discarded. DRAM 143 also stores compressed video in a first-in-first-out (FIFO) buffer 280. Video data from television cable 101, direct satellite receiver front end 103 and DVD 105 will generally be transmitted in compressed form. This saves transmission bandwidth and storage space. One of the tasks of digital media processor 130 is to decompress the video data. Current video compression formats (such as MPEG2) and all contemplated future video compression formats are nonlinear. That is, the different portions of the video data stream are compressed to differing degrees. Thus a constant rate of received video data represents varying amounts of video. Following decompression, digital media processor must supply video data in a constant rate to be viewed. Compressed video FIFO buffer 270 is necessary to smooth out the variations in the rate of receipt. This permits the decompression process to neither overflow with too much compressed data nor underflow with no compressed data ready for decompression. This is possible because the compressed video data stream represents a constant rate video data stream that is to be viewed. Thus the overall average compressed video data rate corresponds to the constant real time viewing rate.

Figure 5:
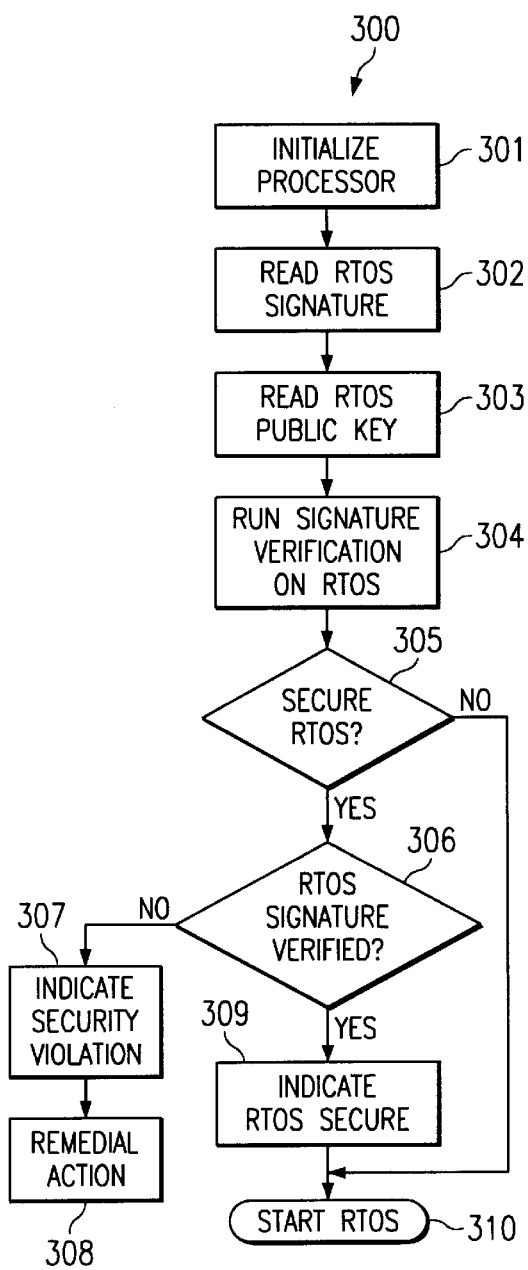
FIG. 5 is a flow chart of the initial operation including the operating system verification of the digital media processor illustrated in FIG. 1.

FIG. 5 is a flow chart 300 of an example of digital media processor 130 operations controlled by boot ROM 135. Upon each initial application of electric power to set top box system 100, digital media processor begins executing the program stored in a predetermined location within boot ROM 135. Those portions of this program within boot ROM 135 relevant to this invention are illustrated in FIG. 5. Program 300 first initializes digital media processor 130 (processing block 301). This process would include clearing registers and caches, setting the initial operating mode and the like, in a manner known in the art. Following initialization of the processor, program 300 reads the signature portion 211 of RTOS 210 stored in flash EPROM 141

(processing block 302). Program 300 next reads the RTOS public key 203 from boot ROM 135 (processing block 303). Next program 300 verifies the signature portion 211 of RTOS 210 (processing block 304). In accordance with the known art of public key encryption such as the RSA algorithm, signature portion 211 is produced by operating upon all of RTOS 210 with a secret private signature key. The original data of signature portion 211 is recovered by a reverse process employing RTOS public signature key 203 stored in boot ROM 135. This signature verification process takes into account what is know as a "trap door" function. It is a very difficult process to produce a particular signature portion knowing only the public key. A change of any portion of RTOS 210 is very likely to result in a change in the signature portion 211 in a manner that cannot be predicted from only the RTOS public signature key 203. Thus it is possible to detect any change in RTOS 210 employing the signature portion 211.

Following the verification, program 300 tests the verified signature portion to determine if RTOS 210 supports secure applications (decision block 305). This invention contemplates that digital media processor 130 could be embodied in applications not requiring the security of set top boxes. In such applications, the verified signature portion 211 indicates that the RTOS need not be secured. Note that even a non-secure RTOS must have its stub verified. Failure of the signature verification is fatal whether the RTOS is secure or non-secure. Program 300 bypasses other steps and starts RTOS 210 (processing block 310) if this signature portion 211 indicates a non-secure use. This will typically involve loading at least a portion of RTOS 210 into DRAM 143. It is anticipated that DRAM 143 will allow much faster memory access than flash EPROM 141. Thus loading portions of RTOS 210 into DRAM 143 will enable faster operation.

If the verified signature portion indicates that RTOS 210 is to support secure applications (decision block 305), then program 300 tests to determine if RTOS 210 can be verified as correct (decision block 306). As described above, the trap door function of the private key signature with public key signature makes it a very difficult task to modify RTOS 210 without producing an unpredictable modification of signature portion 211. Thus the initial program stored in boot ROM 135 will almost certainly be able to detect unauthorized modification of RTOS 210. This verification of RTOS 210 permits the vendor of set top box system 100 to be confident of the security of the system.

If the verified signature portion is not verified as secure, then program 300 indicates that RTOS 210 is non-secure (processing block 307). Thereafter program 300 takes remedial action (processing block 308). This remedial action can take many forms. At the most severe, this remedial action could be complete disablement of set top box 110. Shutting down media processor 130 will disable set top box 110 since it is the intelligence of set top box 110. In most secure applications running a non-verified RTOS would be considered very dangerous and the only reasonable remedial action is disabling set top box 110. In a few cases a less severe remedial action may be appropriate. As a less severe remedial measure, digital media processor 130 could be programmed to no longer interact with video data streams from television cable 101, direct satellite receiver front end 103 and/or DVD 105. This mode may permit running local only transient applications. The remedial action could include signaling the set top box vendor or service provider of the security violation via cable modem 111 or voice band modem 117. The recipient of this notification could then determine either automatically or manually how to deal with the security violation. One method of responding to such a notification of a security violation is to download via cable mode 111 or voice band modem 117 an authorized copy of the RTOS for storage in flash EPROM 143, overwriting the unauthorized copy. Another method is to download a diagnostic program which will verify and determine the extent of the security violation. At the least severe level most suitable for service providers who supply only advertiser supported program material, is to ignore the security violation and permit operation of the non-secure RTOS.

If the verified signature portion is verified as secure, then program 300 indicates that RTOS 210 as verified (processing block 309). Thereafter program 300 starts operation of RTOS 210 (processing block 310). As described above this would typically involve copying at least portions of RTOS 210 from flash EPROM 141 to DFAM 143. Following such a copying, program control would be transferred to the RTOS copy in DRAM 143 via a jump instruction. RTOS 210 then enables all the authorized functions of set top box system 100.

The entire RTOS could be encrypted using the private key as an alternative to employing merely a signature verification process. The steps illustrated in FIG. 5 would be similar except that the entire RTOS must be decrypted using the public key rather than just the signature portion. In this event, the decrypted RTOS would be copied to a operating portion of DRAM 143 upon verification. Thereafter program control would be passed to this copy of the RTOS from the boot ROM program via a jump instruction. In this case e non-verified RTOS even if copied into the same part of DRAM 143 will not operate. An incorrect decryption of an unauthorized RTOS 210 would likely result in an inoperable operating system. Thus the remedial action is this case disables set top box 110. Note the use of a private key to encrypt and a public key to decrypt is the reverse of the usual private key/public key system. Currently, only the RSA system is know to permit this reverse use.

Figure 6:
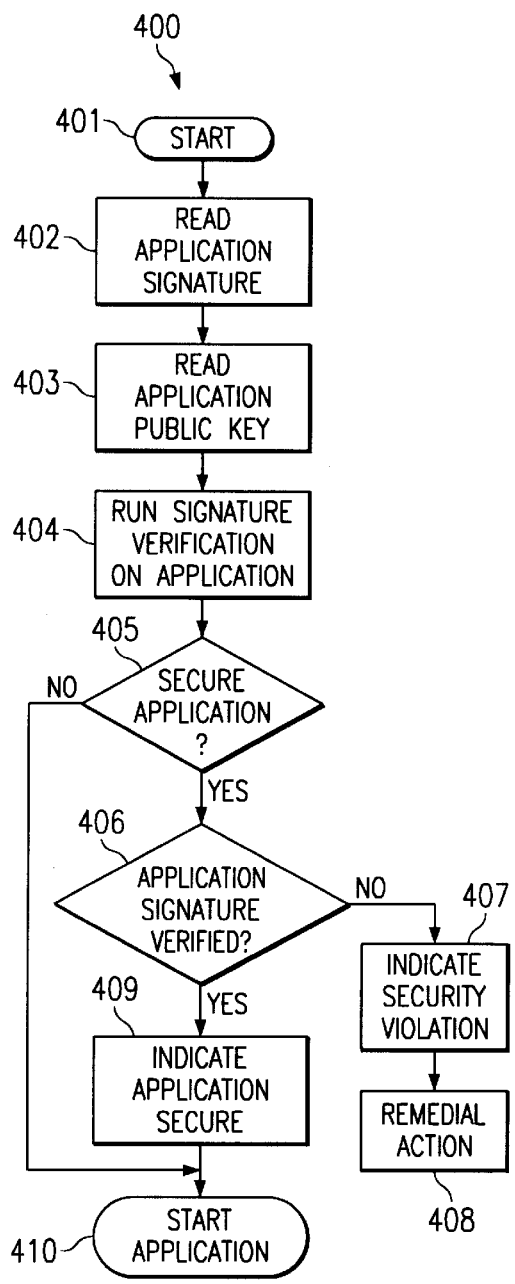
FIG. 6 is a flow chart of the process for verification of an application to the set top box illustrated in FIG. 1.

FIG. 6 is a flow chart 400 of an example of digital media processor 130 operations when called to load and run a resident application. Following the command to start the resident application program (processing block 401), program 400 reads the corresponding signature portion of the resident application stored in flash EPROM 141 (processing block 402). Program 400 next reads the corresponding public key from boot ROM 135 or flash EPROM 141 (processing block 403). As noted above in the memory maps of boot ROM 135 and flash EPROM 141, the public keys for resident application programs may be stored in boot ROM 135 or in flash EPROM 141. Alternatively, set top box 100 may be constructed so that the public keys for some resident applications are stored in boot ROM 135 and the public keys for the remaining resident applications are stored in flash EPROM 141. Next program 400 verifies the signature portion of the resident application (processing block 404). This signature verification process is the same as previously described in conjunction with verification of RTOS 210.

Following the verification, program 400 tests the verified signature portion to determine if the resident application supports security (decision block 405). It is contemplated that any resident application that interacts with program content received from television cable 101, direct satellite receiver front end 103 or DVD 150 will require security. Other resident applications may require security at the option of the application program vendor. Program 400 bypasses other steps, loads the resident application into DRAM 143 and starts the application program (processing block 410) if this signature portion indicates a non-secure use.

If the verified signature portion indicates that the resident application is to support secure applications (decision block 405), then program 400 tests to determine if the resident application can be verified as correct (decision block 406). The trap door function of the private key encryption with public key decryption makes it a very difficult task to modify the resident application program without producing an unpredictable modification of signature portion, thus enabling verification of the authorization of the resident application.

If the signature portion is not verified as secure, then program 400 indicates that the resident application is non-secure (processing block 407). Thereafter program 400 takes remedial action (processing block 408). This remedial action could be any of the many forms described above.

If the signature portion is verified as secure, then program 400 indicates that the resident application as verified (processing block 409). Thereafter program 400 starts the resident application by transferring at least part of its program code to DRAM 143 and transferring control via a jump instruction. It is contemplated that resident application programs will have access to less than all of the digital media processor functions accessible via RTOS 210.

The entire resident application could be encrypted using the private key as described above. The steps illustrated in FIG. 6 would be similar except that the entire resident application must be decrypted using the public key rather than just the signature portion. As previously described, using this technique means that an unauthorized program will probably crash and disable set top box 110.

Figure 7:
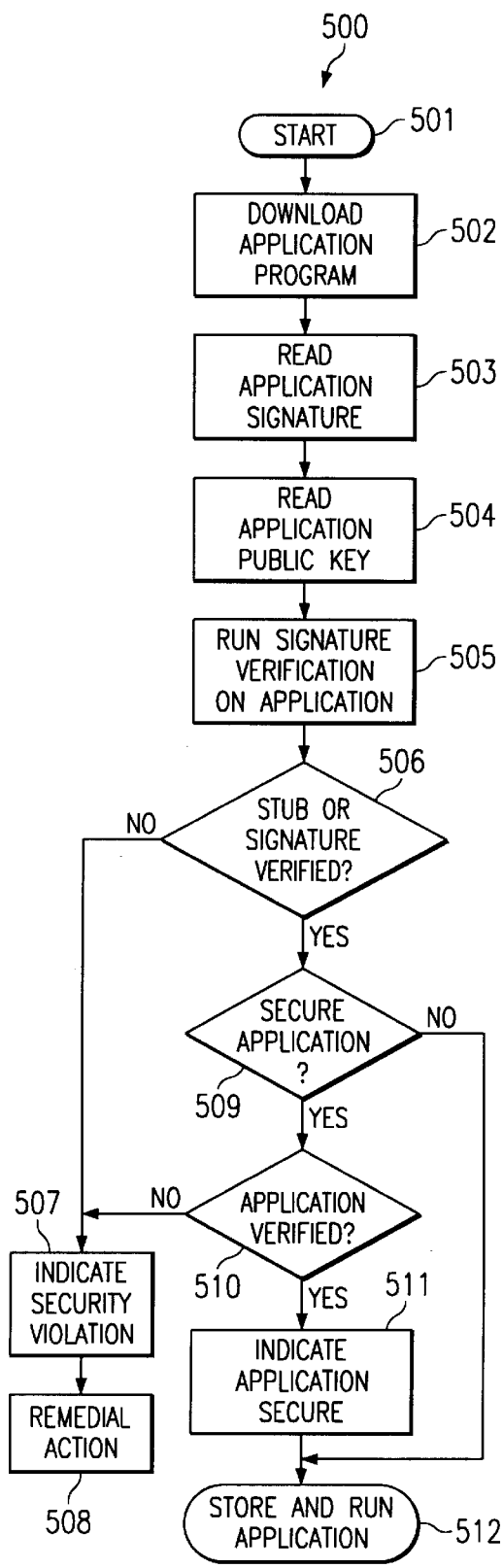
FIG. 7 is a flow chart of the process of verification of a downloaded application program.

FIG. 7 is a flow chart 500 of an example of verification of a downloaded program. Following the command to start downloading an application program (processing block 501), program 500 downloads the application as stores it in DRAM 143 (processing block 502). Then program 500 reads the corresponding signature portion of the downloaded application stored in DRAM 143 (processing block 503). Program 500 next reads the corresponding public key from boot ROM 135 or flash EPROM 141 (processing block 504). As noted above in the memory maps of boot ROM 135 and flash EPROM 141, the public keys for resident application programs may be stored in either boot ROM 135 or in flash EPROM 141. Next program 500 runs signature verification on the downloaded application program (processing block 505). This signature verification process is the same as previously described in conjunction with verification of RTOS 210. A secure application program will have a signature portion that permits verification of the entire downloaded application program. A non-secure application program will have a verifiable signature stub.

Program 500 next tests to determine if the signature or signature stub has been verified (decision block 506). If the signature or signature stub has not been verified as proper, then program 500 would indicate a security violation (processing block 507) and take remedial action (processing block 508). This remedial action could be any of the many forms described above. In addition, another possible remedial action in this instance is to make an further attempt to download this application. Thus program 500 could loop back to processing block 502 to repeat the download. This remedial action would permit recovery if an authorized application was corrupted, such as by noise or the like, during download. If this option is used, it is preferable to abort this loop after a predetermined number of signature verification failures.

Following successful verification of the signature or signature stub, program 500 tests the verified signature portion to determine if the downloaded application supports security (decision block 509). Program 500 bypasses other steps, stores and runs the downloaded application program (processing block 512), if this signature portion indicates a non-secure use. Note that the downloaded application program may be loaded into flash EPROM 141 if it is intended to be another resident application or into DRAM 143 if it is intended to be a transient application.

If the verified signature portion indicates that the downloaded application program supports secure applications (decision block 509), then program 500 tests to determine if the downloaded application can be verified as correct (decision block 511). The trap door function makes it a very difficult task to modify the downloaded application program without producing an unpredictable modification of signature portion, thus enabling verification of the authorization of the downloaded application program.

If the downloaded application program is not verified as correct (decision block 510), then program 500 indicates that the downloaded application is non-secure (processing block 507). Thereafter program 500 takes remedial action (processing block 508). This remedial action could be any of the many forms described above and may include making a further attempt to download this application program.

If the downloaded application is verified as correct (decision block 510), then program 500 indicates the downloaded application is secure (processing block 511). Thereafter program 500 stores and runs the downloaded application program (processing block 512). As described above, this storage will be in flash EPROM 141 if the application is a resident application or in DRAM 143 if the application is a transient application. Program 500 starts the downloaded application program by transferring at least part of its program code to DRAM 143 and transferring control via a jump instruction.

The entire downloaded application program could be encrypted using the private key as described above. The steps illustrated in FIG. 7 would be similar except that the entire downloaded application must be decrypted using the public key rather than just verifying the signature portion. As previously described, using this technique means that an unauthorized program will probably crash and disable set top box 110.

This security technique relies upon the security of boot ROM 135. Since boot ROM 135 is located on the same integrated circuit as the other parts of digital media processor 130 and it is a read-only, it is not subject :o unauthorized change. Therefore the verification function cannot be changed to verify a unauthorized RTOS. Many of the security functions will be available only to the RTOS based upon program privilege levels. Thus most security functions cannot be easily compromised. The private key used for encryption will only be known to the RTOS supplier, or only to the manufacturer of digital media processor 130. In addition the public key needed to verify the signature or to decrypt the RTOS is also in the boot ROM. This prevents substitution of another public key in an attempt to cause digital media processor 130 to verify an unauthorized RTOS. Additionally, the resident applications are also secure. The private keys for resident applications can be known only by the application owner, or by the service provider who authorizes the application.

The above private key/public key signature verification system will protect against most security attacks. However, if the private key used to authenticate the RTOS is compromised, the security may be defeated by replacing the RTOS with an unauthorized RTOS which will still look authentic.

The simplest way to detect a modified RTOS would be to check the resident RTOS against the authorized program. An application program, such as a diagnostic program, could read certain memory locations in the RTOS to see if they contain the expected values. This may not always reveal unauthorized substitution of another RTOS. Many complex data processors such as would be used to embody digital media processor 130 support virtual memory. In a virtual memory environment, the RTOS is quite capable of virtualising itself. Thus the unauthorized RTOS would intercept the confirming read attempts and return the results that the diagnostic application expects from a copy of the authorized RTOS. However, this unauthorized RTOS would run instead of the original RTOS consequently compromising security. The present inventors propose a technique which assures that an application can access a portion of memory directly without being intercepted and translated to a virtual address by the RTOS.

Figure 8:
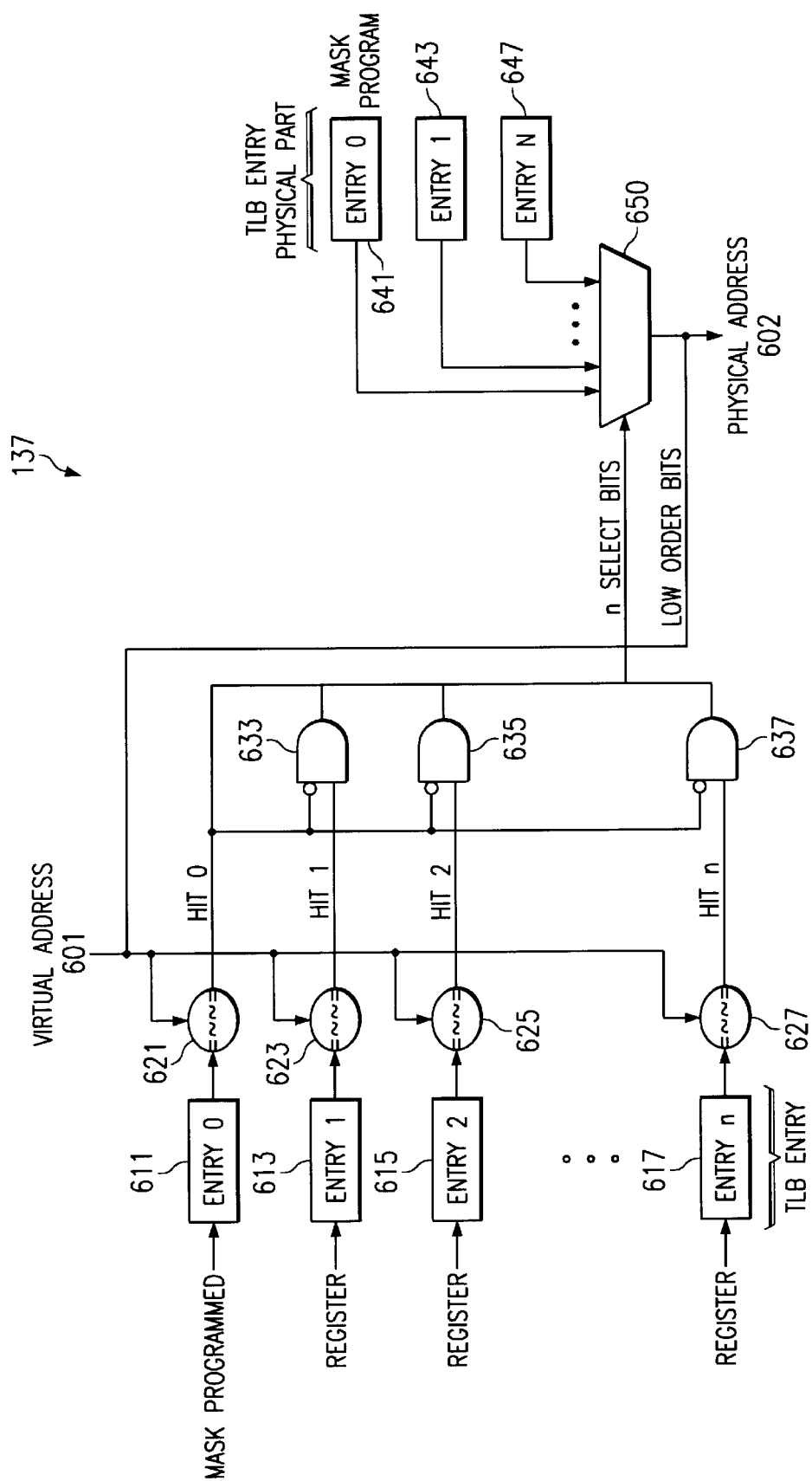
FIG. 8 is a schematic diagram of a translation look aside buffer preventing virtual memory relocation of a certain page of memory of the digital media processor of FIG. 1.

FIG. 8 illustrates in block diagram form a translation look-aside buffer (TLB) 137 having a locked page in accordance with this invention. Virtual memory applications translate a virtual address into a physical address. As is known in the art, TLB 137 receives a virtual address on bus 601 and supplies a corresponding physical address on bus 602. A predetermined number of most significant address bits of the virtual address are supplied to a plurality of comparators 621, 623, 625 and 627. The remaining least significant address bits of the virtual address on bus 601 are passed unchanged to the corresponding bits of physical address on bus 602. Each comparator 621, 623, 625 and 627 has a corresponding virtual address register 611, 613, 615 and 617, respectively. The comparators 621, 623, 625 and 627 determine if the predetermined number of most significant bits of the virtual address on bus 601 matches the contents of the respective registers 611, 613, 615 and 617. Each comparator 621, 623, 625 and 627 supplied match indication to multiplexer 650. Multiplexer 650 supplies the predetermined number of most significant bits from one of the physical address registers 641, 643, 645 and 647. The physical address register selected by multiplexer 650 corresponds to the comparator 621, 623, 625 or 627 detecting a match. These most significant physical address bits selected by multiplexer 650 are supplied to the most significant bits of the physical address on bus 602. Thus TLB 137 substitutes a predetermined number of bits of a physical address for the same number of bits of the virtual address. The number of possible substitutions enabled by the virtual address register and its corresponding comparator and physical address register is limited only by considerations of operation code space to access the registers and the amount of space occupied by the TLB 137. In the prior art, virtual address registers 611, 613, 615 and 617 and physical address registers 641, 643, 645 and 647 are alterable via software. Thus the real time operating system has control of the mapping of virtual addresses to physical addresses.

In this invention one of the virtual address registers and the corresponding physical address register are fixed upon manufacture. In the preferred embodiment this pair of registers are mask programmable at metal layers, permitting the locked page to be selected upon manufacture of the integrated circuit including TLB 137 but unalterable following manufacture. FIG. 8 illustrates a fixed virtual address register 611 and its corresponding fixed physical address register 641. In the preferred embodiment the virtual address stored in fixed virtual address register 621 equals the physical address stored in fixed physical address register 641. In the preferred embodiment, the critical code to be protected from relocation will be stored in flash EPROM 141 within the boundary of physical addresses covered by this virtual address register. Attempts to write to either fixed virtual address register 611 or fixed physical address register 641 will fail because these registers are fixed in hardware. Preferably there will be no faults or errors generated by an attempt to modify these registers. Alternatively, neither the fixed virtual address register 611 nor the fixed physical address register 641 are accessible via the instruction set architecture. Since the reason that fixed virtual address register 611 or fixed physical address register 641 are fixed is to prevent alteration, no access via the instruction set architecture would ever be required.

A further feature of this invention is illustrated in FIG. 8. Note that the match indication from comparator 621 is supplied directly to multiplexer 650. The match indication from other comparators form the noninverting input to respective AND gates 633, 635 and 637. Each of these AND gates 633, 635 and 637 receives the match indication from comparator 621 on an inverting input. Thus a match indication from comparator 621 prevents supply of a match indication to multiplexer 650 from any other comparator. This prevents an unauthorized person from leaving the original RTOS in place to respond to security queries while attempting to run an unauthorized RTOS from a relocated part of memory. Any memory accesses to the physical memory addresses of virtual address register 611 and physical address register 641 cannot be relocated but are directed to the physical address of the original RTOS.

With this invention an unauthorized attempt to relocate the RTOS may occur, but no actual address translation will take place. Thus if the original RTOS is always located in this memory area, a diagnostic program can read signature locations with assurance that the original physical locations are being accessed. Thus the diagnostic program can determine if the RTOS is compromised, and take appropriate remedial action. This remedial action may include any of the remedial actions previously described.

The set top box 100 illustrated in FIG. 1 includes an additional potential security problem. DRAM 143 stores a video data stream that has been decrypted but not decompressed. This video data is stored in compressed video FIFO buffer 280. It is possible for an unauthorized person to intercept this data as it is being transferred from digital media processor 130 to DRAM 143 or as it is being transferred from DRAM 143 and digital media processor 130. These data transfers will be interleaved with other data traffic between digital media processor 130 and DRAM 143, but it is feasible to separate the compressed video data. Because the video is compressed, a minimal amount of memory would be required to store this data. Some content providers would like to prevent their video programming from such interception. Note that interception of the video data stream at this point would permit generation of plural, identical and immediately viewable copies of the video.

FIG. 9 illustrates in flow chart form a process preventing such unauthorized interception. Following reception of the video data stream (processing block 701) digital media processor 130 decrypts the video data stream (processing block 702). This decryption is subject to security procedures to ensure that the user is authorized to view this video data stream. Following this decryption of the source program, digital media processor encrypts the video data stream again (processing block 703). In this instance a relatively simple encryption is used, such as a simplified DES algorithm. The encryption key is preferably derived from the chip identity number stored in chip identity register 133. This encrypted data is stored in compressed video FIFO buffer 280 (processing block 704). At the appropriate time, the video data is recalled from compressed video FIFO buffer 280 (processing block 705). The recalled data is decrypted using the encryption key derived from the chip identity number (706). This data is then ready for further processing (processing block 707).

This technique has the advantage that the compressed video data stream temporarily stored in compressed video FIFO buffer 280 can only be read by the particular digital media processor 130. The chip identity number is unique to that particular digital media processor. The video data cannot be viewed by any other means, even another identical set top box system 100 without breaking the code. This is believed adequate security by most content providers. Additionally, the encryption and decryption is transparent to the user. There only needs to be a small additional processing capacity available within digital media processor 130 beyond the minimal requirement of the particular application.

Another potential security problem is created by the hardware debugger/emulator. The semiconductor manufacturer of digital media processor 130 will generally also sell hardware debugger/emulator systems to application program developers, including operating system developers. Generally such hardware debugger/emulator systems by design have unlimited access to all of memory, including "private" areas. Thus a hardware debugger/emulator system of the type known in the art would permit unauthorized breach of the security of set top box system 100.

The following modification to the hardware debugger/emulator system will guard against this potential security problem. The hardware debugger/emulator will operate in two modes, a process mode and a raw mode. In the process mode, the hardware debugger/emulator may only access a particular process or application program. All system access is permitted in the raw mode.

FIG. 10 is a flow chart illustrating the process of selecting the mode at the hardware debugger/emulator. Upon start of the hardware debugger/emulator (processing block 801), process 800 reads the signature portion 211 of RTOS 210 stored in flash EPROM 141 (processing block 802). Process 800 next reads the RTOS public key 203 from boot EPROM 135 (processing block 803). Next process 800 verifies the signature portion 211 of RTOS 210 (processing block 804). Following the verification, process 800 tests the verified signature portion to determine if RTOS 210 supports secure applications (decision block 805). As previously described, digital media processor 130 could be Embodied in applications not requiring the security of set top boxes. In such applications, the verified signature portion 211 indicates that the RTOS need not be secured. If this is the case, then process 800 bypasses other steps activates the hardware debugger/emulator in raw mode (processing block 806).

If the RTOS supports secure applications (decision block 805), then process 800 checks to determine if the chip identity number stored in chip identity register 133 is of the subset of possible chip identity numbers that permit the raw mode for secure applications (decision block 807). Some program developers, particularly RTOS developers, will need access to the raw mode of the hardware debugger/emulator. This invention contemplates that a bit or bits or some subset of the possible coding of the chip identity number will be reserved for hardware debugger/emulators supporting this use. Thus only a certain limited number of the digital media processors 130 will permit raw mode operation of the hardware debugger/emulator in environments supporting the security described above. The manufacturer of digital media processor 130 will supply these particularly identified chips only to trusted program developers.

If the chip identity number does not permit raw mode operation (decision block 807), process 800 reads a token from the particular process or application program under development in the hardware debugger/emulator. Process 800 then determines if this token is verified as proper (decision block 809). This process could take place using the private key encryption and public key decryption described above, or another verification procedure could be employed. If the token is not verified (decision block 809), then process 800 take appropriate remedial action (processing block 810). The various types of remedial action that could be taken have already been described. If the token is verified (decision block 809), then process 800 activates the hardware debugger/emulator in process mode (processing block 811). In the process mode, the hardware debugger/emulator may only access a particular process or application program corresponding to the verified token.

This process satisfies all the requirements of the users. Program developers who use digital media processor 130 in a nonsecure application will have complete access to the functions of the hardware debugger/emulator. Program developers who use digital media processor 130 in secure applications will have access limited. Most of those program developers will use the secure RTOS and have access only to their own programs as identified by the token encrypted with their corresponding private key. RTOS developers will have complete system access but only to particular digital media processors having the proper chip identity numbers. Thus the manufacturer of digital media processor 130 can have the proper level of control in order protect the security of set top box systems 100.

The security inventions of this patent application have been described in conjunction with a particular type system requiring computer security, i.e. the set top box. Those skilled in the art would realize that the use of these security techniques are not limited to this example. Particularly, almost any computer system requiring that some functions have a degree of security may employ these techniques.

What is claimed is:

1. A method of verification of the security of a resident program in a computer comprising the steps of:
   storing the resident program in a range of predetermined physical addresses in memory;
   preventing any virtual address relocation of said range of physical addresses where the resident program is stored;
   loading a diagnostic program;
   employing said diagnostic program to check the resident program against a standard to determine whether the resident program has been altered; and
   indicating verification of the resident program if it matches said standard and non-verification of the resident program if it fails to match said standard.

2. The method of claim 1, wherein:
   said step of preventing virtual address relocation of said physical addresses where the resident program is stored consists of providing a table look-aside buffer having a fixed virtual address register storing a virtual address fixed upon manufacture encompassing said range of predetermined physical addresses and a corresponding fixed physical address register storing a physical address fixed upon manufacture encompassing said range of predetermined physical addresses.

3. The method of claim 1, further comprising the step of:
disabling normal operation of the resident program on indication of non-verification of the resident program.

4. The method of claim 1, further comprising the step of:
transmitting a predetermined message via a modem to a predetermined phone number on indication of non-verification of the resident program.

5. The method of claim 1, further comprising the step of:
downloading another copy of all of the resident program via a modem on indication of non-verification of the resident program.

6. The method of claim 1, further comprising the step of:
transmitting a predetermined message via a modem to a predetermined recipient on indication of non-verification of the resident program.

7. The method of claim 1, further comprising the step of:
disabling the computer on indication of non-verification of the resident program.

8. The method of claim 1, further comprising the step of:
SECURE COMPUTING DEVICE INCLUDING VIRTUAL MEMORY TABLE LOOK-ASIDE BUFFER WITH NON-RELOCATABLE PAGE Of MEMORY enabling the computer to run some application programs and disabling the computer from running other application programs.

9. The method of claim 2, further comprising the steps of:
comparing a virtual address generated by the computer with a plurality of virtual address registers including the fixed virtual address register and at least one writeable virtual address register;

recalling the physical address from the fixed physical address register upon a match of the virtual address generated by the computer and the virtual address stored in the fixed virtual address register regardless of whether the virtual address generated by the computer matches any virtual address stored in the at least one writeable virtual address register; and recalling a physical address from a writeable physical address register corresponding to a writeable virtual address register matching the virtual address generated by the computer unless the virtual address generated by the computer also matches the virtual address stored in the fixed virtual address register.

* * * * *